United States Patent

Lang

[11] Patent Number: 5,716,100
[45] Date of Patent: Feb. 10, 1998

[54] MOMENT LOCK ASSEMBLY FOR VEHICLE SEAT BACK

[75] Inventor: Ulf Otto Lang, Trollhattan, Sweden

[73] Assignee: Lear Corporation, Southfield, Mich.

[21] Appl. No.: 745,001

[22] Filed: Nov. 7, 1996

[51] Int. Cl.⁶ ............................................. B60N 2/36
[52] U.S. Cl. .................. 297/378.12; 297/378.1; 297/452.2
[58] Field of Search ................... 297/378.12, 378.1, 297/257, 452.2

[56] References Cited

U.S. PATENT DOCUMENTS

| | | | |
|---|---|---|---|
| 4,068,871 | 1/1978 | Mercer | 297/378.12 X |
| 4,206,946 | 6/1980 | Maertens | 297/378.12 X |
| 4,268,086 | 5/1981 | Okuyama | 297/378.12 X |
| 4,958,877 | 9/1990 | Lezotte et al. | 297/378.1 X |
| 5,007,680 | 4/1991 | Miyauchi et al. | 297/378.12 |
| 5,038,437 | 8/1991 | Russell et al. | 297/378.12 X |
| 5,328,243 | 7/1994 | Akiyama | 298/378.12 |
| 5,368,355 | 11/1994 | Hayden et al. | 297/378.12 X |
| 5,380,060 | 1/1995 | Sponsler et al. | 297/378.12 X |
| 5,383,695 | 1/1995 | Woziekonski et al. | 297/378.12 X |
| 5,383,707 | 1/1995 | Osenkowski et al. | 297/378.12 X |
| 5,398,995 | 3/1995 | Hurite | 297/378.12 |
| 5,415,491 | 5/1995 | Hayakawa et al. | 297/378.12 X |
| 5,419,616 | 5/1995 | Poetzold | 297/378.12 |
| 5,527,087 | 6/1996 | Takeda et al. | 297/378.12 X |
| 5,570,931 | 11/1996 | Kargilis et al. | 297/378.12 |
| 5,603,550 | 2/1997 | Holdampf et al. | 297/378.12 X |

FOREIGN PATENT DOCUMENTS

| | | | |
|---|---|---|---|
| 2353415 | 12/1977 | France | 297/378.12 |
| 1555857 | 7/1970 | Germany | 297/378.12 |
| 2339536 | 2/1975 | Germany | 297/378.12 |
| 2453732 | 5/1976 | Germany | 297/378.12 |

*Primary Examiner*—Jose V. Chen
*Assistant Examiner*—Rodney B. White
*Attorney, Agent, or Firm*—Howard & Howard

[57] ABSTRACT

A folding passenger seat assembly for a motor vehicle comprises a seat cushion and a backrest portion. The backrest portion includes a backrest frame having a first end and a second end each pivotally supported about a folding axis. A first latch selectively locks the first end of the backrest frame in the vertical use position and a second latch selectively locks the second end of the backrest frame in the vertical use position. A remote actuator simultaneously unlocks both the first and second latches so that the backrest frame can be pivoted between use and folded positions. The second latch includes a bell-shaped jam key which is pivoted on a pintle about a latch axis spaced parallel from the folding axis. An abutment seat is fixed relative to the folding axis for engaging the jam key when the backrest frame is locked in the vertical use position. The jam key has a convex engagement surface having a circular curvature centered about the latch axis, while the abutment seat includes a concave engagement surface having a circular curvature centered about the latch axis only when the backrest frame is in the use position. The distance between the latch axis and the abutment seat diminishes as the backrest frame is moved from the use position toward the folded position. As a result, the jam key is compressed between the pintle and the abutment seat if the backrest frame is forced toward the folded position while the first and second latches are locked.

22 Claims, 4 Drawing Sheets

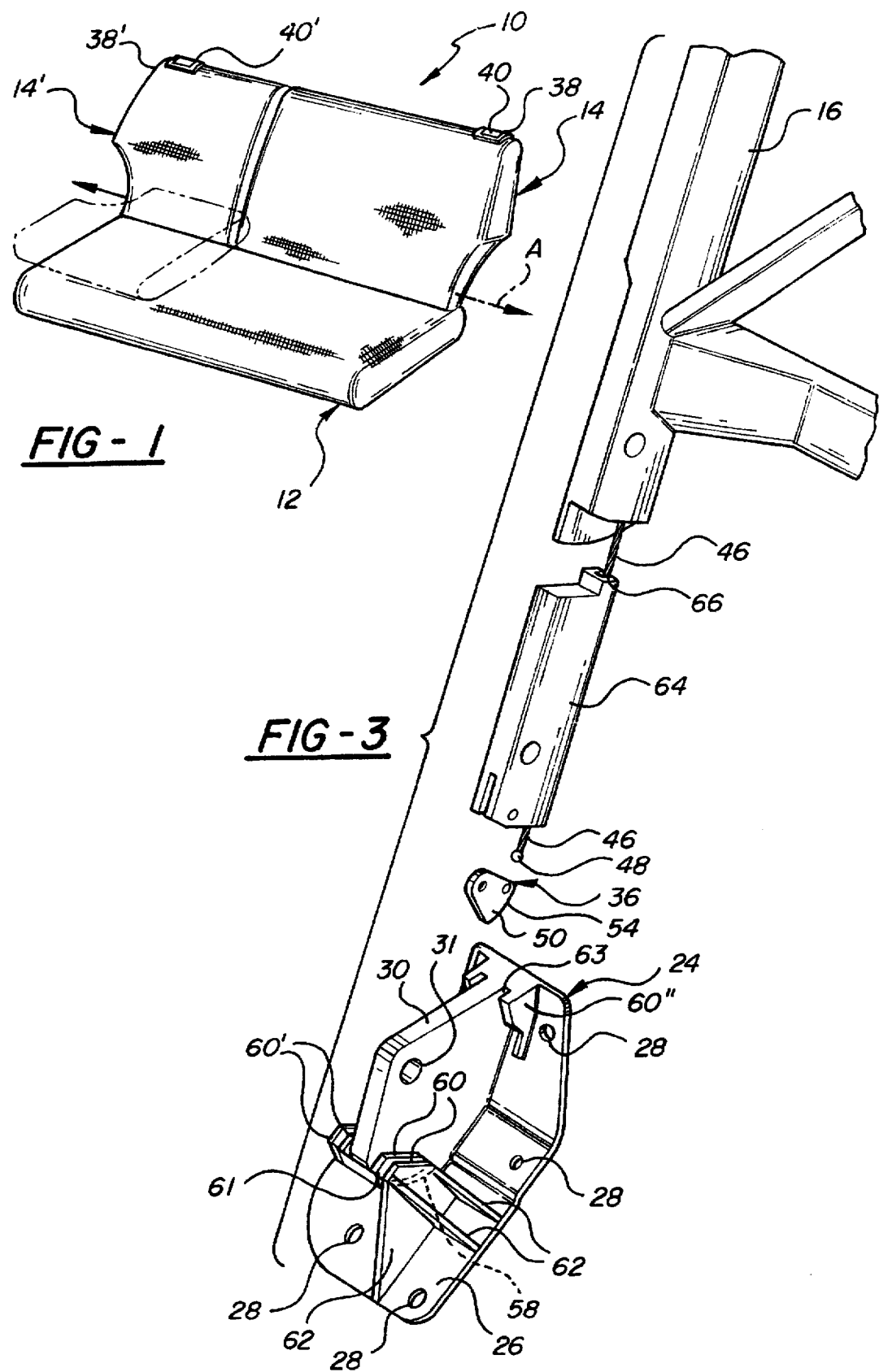

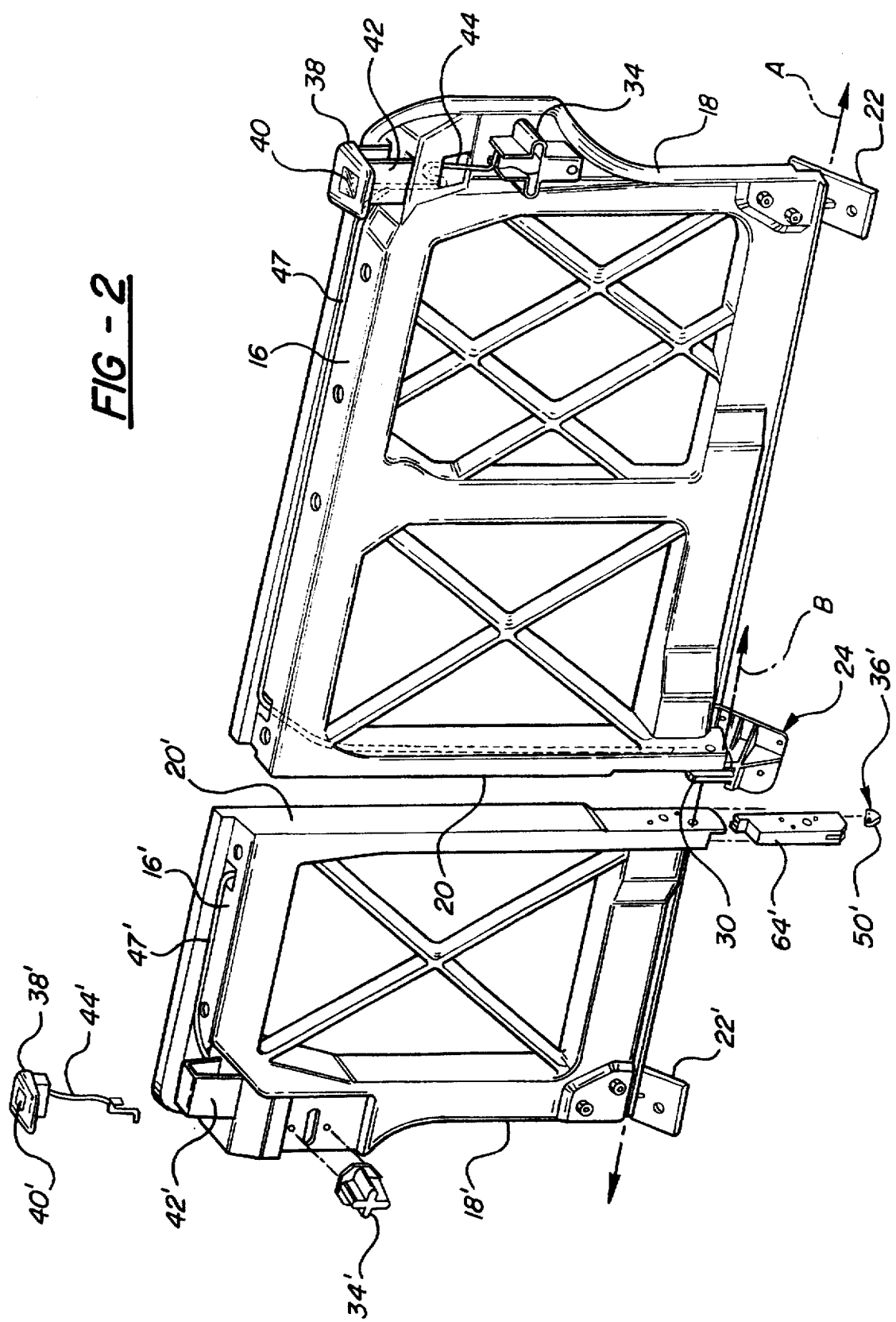

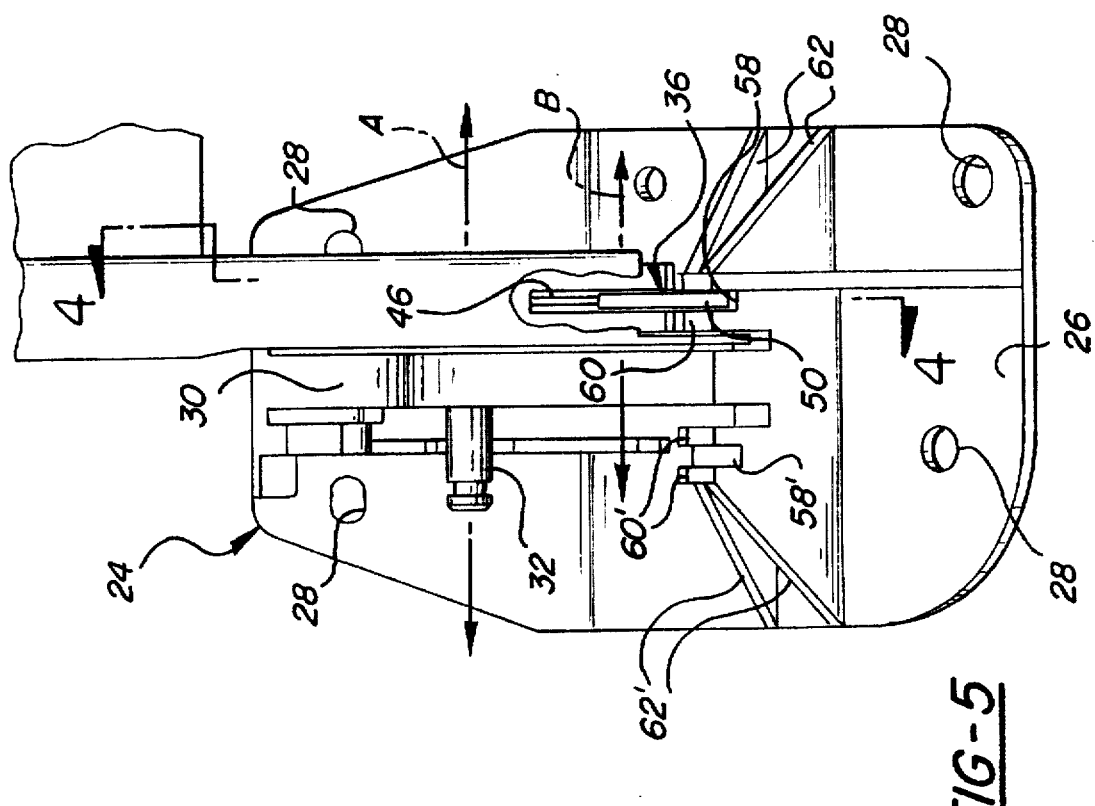
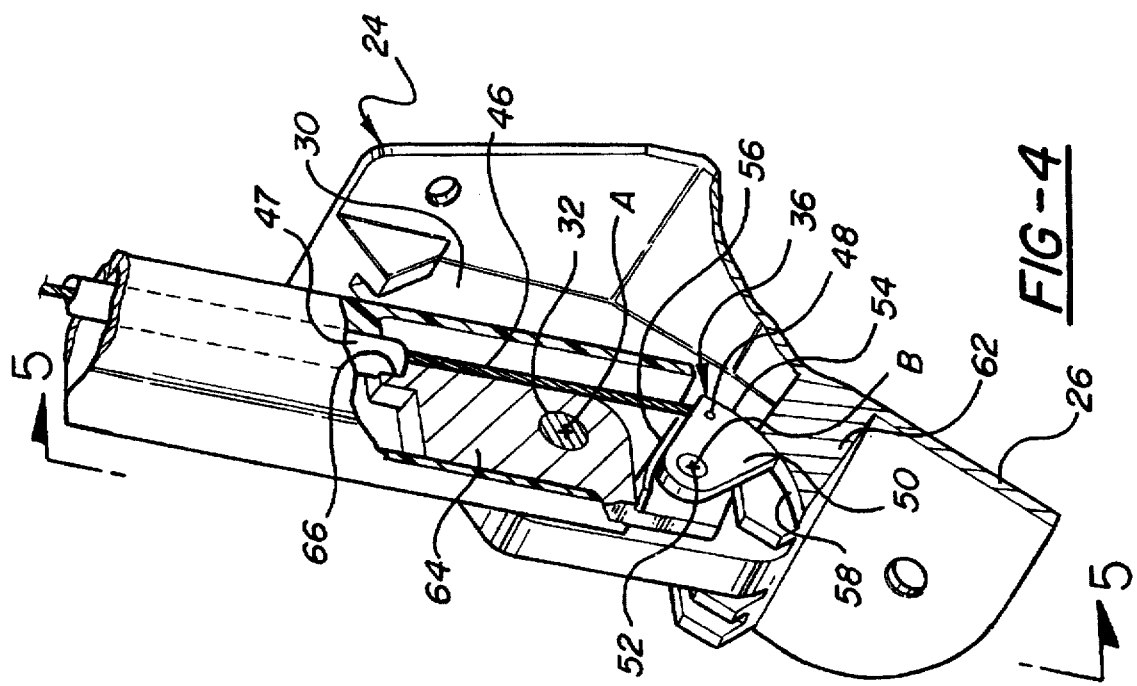

MOMENT LOCK ASSEMBLY FOR VEHICLE SEAT BACK

TECHNICAL FIELD

The subject invention relates to a folding backrest for a passenger seat assembly in a motor vehicle, and, more particularly to an improved latch mechanism therefor.

BACKGROUND OF THE INVENTION

Rear seat assemblies in motor vehicles are often designed with a backrest portion which folds or collapses to a generally horizontal non-use position for increased cargo carrying capacity. The backrest portion pivots between a vertical use position and horizontal folded position with a manual latch which is manipulated to release the backrest portion from the vertical use position.

The prior art manual latches provide reliable holding power because the backrest portion remains securely fixed in place until intentionally released. However, manual latches are rather costly to manufacture due to the numerous moving components which require often complex and tightly toleranced shapes. With the complex components also comes an increase in labor/fabrication costs and often times an increase in weight. Therefore, there is a need to provide a less expensive and more durable manual latch type seat assembly.

SUMMARY OF THE INVENTION AND ADVANTAGES

In a folding backrest for a passenger seat assembly in a motor vehicle, the subject invention contemplates a backrest frame having a first end and a second end. A first hinge is operatively associated with the first end of the backrest frame and a second hinge is operatively associated with the second end of the backrest frame. The first and second hinges pivotally support the backrest frame about a folding axis for movement between a vertical use position and a folded position. A first latch is associated with the first end of the backrest frame for selectively locking the backrest frame in the vertical use position. Similarly, a second latch is operatively associated with the second end of the backrest frame for selectively locking the backrest frame in the vertical use position. The second latch includes a jam key pivotally carried on a latch axis spaced parallel from the folding axis for movement between extended and retracted positions. The second latch also includes an abutment seat fixed relative to the second latch for engaging the jam key when the backrest frame is locked in the vertical use position. An actuator simultaneously unlocks the first and second latches so that the jam key pivots about the latch axis out of engagement with the abutment seat prior to moving the backrest frame toward the folded position.

The construction of the second latch including the pivoting jam key provides durable and secure holding power to lock the backrest portion in its vertical use position. This construction is economical to manufacture, convenient to assemble, and light in weight. It is designed to efficiently and reliably transfer loads to the floor pan or other structural component of the vehicle during sudden deceleration. The jam key will actually become more securely compressed against the abutment surface as loading increases. Also, it is not sensitive to normal manufacturing tolerance variations amongst the moving components. Furthermore, the second key may be constructed so as to provide an interlock function for the backrest.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a simplified perspective view of a folding passenger seat assembly for a motor vehicle according to the subject invention, showing the left half-section of the backrest portion in the folded position in phantom;

FIG. 2 is a partially exploded perspective view of the right and left backrest frames of the subject invention;

FIG. 3 is a fragmentary exploded perspective view of the second hinge, jam key and portion of the right backrest frame;

FIG. 4 is a partially-sectioned perspective view of the second hinge, jam key and portion of the right backrest frame taken along lines 4—4 of FIG. 5;

FIG. 5 is a front view taken along lines 5—5 of FIG. 4; and

DETAILED DESCRIPTION OF THE PREFERRED EMBODIMENT

Figure 6:
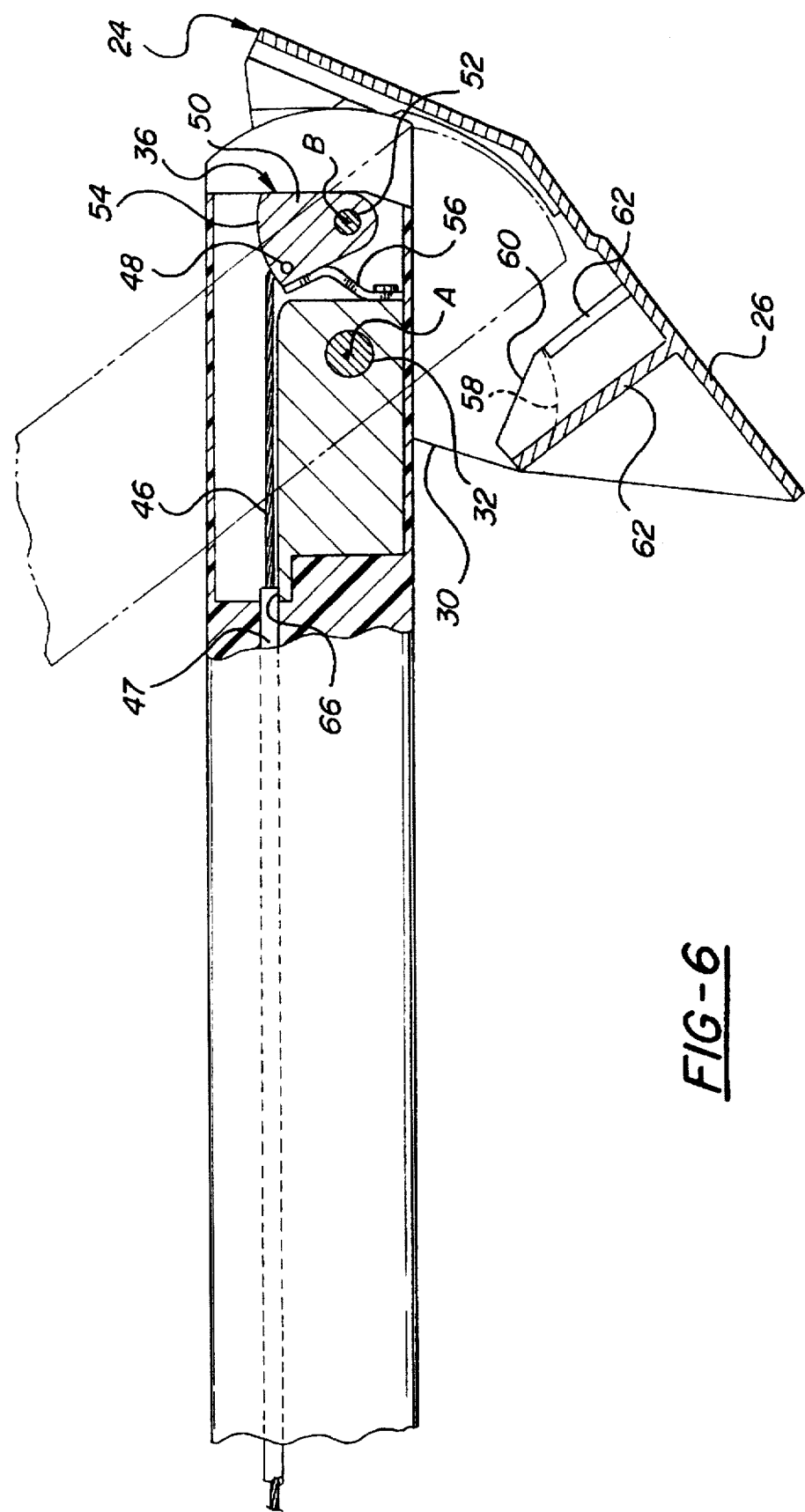
FIG. 6 is a partially-sectioned side view of the second hinge, jam key and portion of the right backrest frame, showing the right backrest frame part way to the folded position in phantom and in the full folded position in solid.

Referring to the Figures, wherein like numerals indicate like or corresponding parts throughout the several views, a folding passenger seat assembly for a motor vehicle is generally shown at 10 in FIG. 1. The folding passenger seat assembly 10 includes a seat cushion, generally indicated at 12, and a primary backrest portion, generally indicated at 14. The primary backrest portion 14 is composed of a structural backrest frame 16 encased in a foam and trim covering. The backrest frame 16 has a first end 18 and a second end 20 (FIG. 2). As shown in FIG. 1, the primary backrest portion 14 is preferably of the so-called 60/40 split type including a companion secondary backrest portion 14' of shorter length which can be independently manipulated. To facilitate description and understanding, in referring to the companion backrest portion 14' and other attendant elements, parts or structural features corresponding to those described in connection with the primary backrest portion 14 are indicated by the same reference number plus a prime designation, both in the text and in the drawing figures. As an alternative to being of the 60/40 split type, the primary backrest portion 14 may be of the traditional full length one piece type (not shown) which is coextensive with the seat cushion 12.

Looking at FIGS. 2–6, a first hinge 22 is operatively associated with the first end 18 of the backrest frame 16 and a second hinge 24 is operatively associated with the second end 20 of the backrest frame 16. The first 22 and second 24 hinges pivotally support the backrest frame 16 relative to the seat cushion 12 about a horizontal folding axis A for movement between a vertical use position and a folded position (shown in phantom in FIG. 1). The second hinge 24, as best shown in FIGS. 3 through 6, comprises a base plate 26 adapted to be fastened through mounting holes 28 by threaded fasteners or the like (not shown) directly to the floor or other structural surface in the passenger compartment of the motor vehicle. In the preferred embodiment shown in the accompanying Figures, the base plate 26 may be angled for proper conformity with the attachment surface.

A center bracket 30 extends generally perpendicularly from the base plate 26. A hinge pin 32 is carried in the center bracket 30 within a bore 31 and pivotally connects the second end 20 of the backrest frame 16 to the center bracket 30. In the preferred embodiment, the second hinge 24 also pivotally supports the one interior end of the secondary backrest portion 14'. Accordingly, the secondary backrest portion 14' is independently pivotally supported on the hinge pin 32 about the folding axis A for movement between a vertical use position and a folded position. It will be appreciated that the one second hinge 24 need not be united for common use by both backrest portions 14, 14', but rather independent hinges can be employed if the backrest is to remain of the split type.

The primary backrest portion 14 is selectively locked in the vertical use position by a first latch 34, associated with the first end 18 of the backrest frame 16, and a second latch, generally indicated at 36 and associated with the second end 20 of the backrest frame 16. That is, when the first 34 and second 36 latches are in the locked condition, the backrest portion 14 is securely restrained in its use position as shown in FIG. 1. However, when the first 34 and second 36 latches are unlocked, the backrest portion 14 is freely pivoted about the folding axis A toward the folded condition as shown in phantom in FIG. 1.

A remote actuator 38 is supported on the backrest frame 16 for simultaneously unlocking both the first 34 and second 36 latches so that the backrest portion 14 may be freely pivoted about the folding axis A toward the folded condition. The remote actuator 38 may be located in any conveniently accessible location, and in the preferred embodiment is positioned along the top edge of the backrest portion 14 as illustrated in FIGS. 1 and 2. The remote actuator 38 is preferably a lever actuated device having a small indicator window 40 showing the color red when in the unlocked condition. The remote actuator 38 is supported atop a tower 42 extending from the backrest frame 16.

As the remote actuator 38 is manipulated to unlock the first 34 and second 36 latches, a push rod 44 operatively connected thereto is simultaneously displaced in a generally vertical direction. The push rod 44 is attached to the first latch 34 and also to the first end of a flexible motion transmitting cable or cable 46. The cable 46 is slidably disposed in a protective sheath-like conduit 47, as like a common Bowden cable. As shown in FIG. 2, the conduit 47 together with the encased cable 46 extend along the upper edge of the backrest frame 16 toward the second end 20 thereof, where they then snake internally toward the second latch 36. A second end of the cable 46 is fitted with a slug 48 shown in FIGS. 4 and 6.

The second latch 36 includes a bell-shaped jam key 50, which is pivoted between extended and retracted positions on a pintle 52 about a latch axis B parallel to the folding axis A. As shown in FIGS. 3–6, the latch axis B is positioned directly below the folding axis A. The jam key 50 includes a convex engagement surface 54 having a circular curvature centered about the latch axis B. The slug 48 of the cable 46 is seated in a receptacle in the jam key 50 so that whenever the cable 46 is displaced, the jam key 50 is arcuately moved a corresponding amount about the latch axis B. A spring 56 is disposed between the backrest frame 16 and the jam key 50 for biasing the jam key 50 toward the extended engaged position (FIG. 4). While the preferred embodiment illustrated in FIGS. 4 and 6 shows the spring 56 to be of the flat type, it will be readily appreciated that other spring types, such as coil or torsion springs, can be used to accomplish the same function of biasing the jam key 50 toward the extended position. Therefore, the spring 56 helps maintain tension on the cable 46 while always urging the jam key 50 toward a locking condition.

The base plate 26 includes an abutment seat 58 fixed relative to the folding axis A for engaging the jam key 50 when the backrest frame 16 is locked in the vertical use position. The abutment seat 58 extends upwardly from the base plate 26 and is structurally supported between flanking side walls 60 offset from the center bracket 30. A lower guide channel 61 is formed adjacent the abutment seat 58, with a corresponding guide channel 63 being provided near the top of the base plate 28 (FIGS. 3–5). As perhaps best shown in FIGS. 3 and 5, reinforcing gussets 62, 62' extend laterally from the outermost side wall 60 and connect to the base plate 26 to strengthen the second hinge 24 and second latch 36 constructions.

The abutment seat 58 includes a concave engagement surface having a circular curvature centered about the latch axis B when the backrest frame 16 is in the use position, as shown in FIG. 4. However, the distance between the latch axis B and the abutment seat 58 diminishes as the backrest frame 16 is moved from the use position toward the folded position. As a result, if the backrest frame 16 is locked in the vertical use position, the jam key 50 will be compressed between the pintle 52 and the abutment seat 58 if forces are placed on the backrest frame 16 attempting to pivot the seat back toward the folded position. This may occur during instances of sudden vehicle deceleration such as in a front collision, when the backrest frame 16 is naturally locked in the vertical use position.

In order that the backrest frame 16 may be constructed of the most efficient and economical materials, the preferred backrest frame 16 includes a reinforcing insert 64 made of a structural material, such as magnesium or the like, capable of withstanding and transferring the stresses foreseeable during the use of the passenger seat assembly 10. The insert 64 is retained in a sleeve-like end of the backrest frame 16, contiguous to the connection at the second hinge 24. The jam key 50 and the hinge pin 32 are both operatively connected to the reinforcing insert 64 so that they may be adequately anchored to bear high stresses. As shown in FIGS. 4 and 6, the top end of the insert 64 includes a receptacle 66 for the conduit 47. A narrow groove 68 in the insert 64 allows passage of the cable 46 until its attachment to the jam key 50. The spring 56 may be secured to the underside of the insert 64.

When the remote actuator 38 is manipulated to unlock the backrest portion 14 from its normal vertical use position, the connected push rod 44 tensions the cable 46, causing the jam key 50 to be pivoted on its pintle 52 out of registry with the abutment seat 58. With the jam key 50 cleared from the path of the abutment seat 58, and the first latch 34 fully disengaged, the backrest portion 14 is free to pivot toward the folded non-use position. However, if forces are placed on the backrest portion 14 urging it toward the folded position before the remote actuator 38 has been manipulated, the first latch 34 together with the second latch 36 via the jam key 50 wedged between the converging pintle 52 and abutment seat 58 will sturdily restrain such forces to protect the seat occupants from harm.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A folding backrest for a passenger seat assembly in a motor vehicle, said assembly comprising: a backrest frame having a first end and a second end; a first hinge operatively associated with said first end of said backrest frame and a second hinge operatively associated with said second end of said backrest frame hinges pivotally supporting said backrest frame, about a folding axis for movement between a vertical use position and a folded position; a first latch associated with said first end of said backrest frame for selectively locking said backrest frame in said vertical use position; a second latch operatively associated with said second end of said backrest frame for selectively locking said backrest frame in said vertical use position; said second latch including a jam key pivotally carried on a latch axis spaced parallel from said folding axis for movement between extended and retracted positions, an abutment seat fixed relative to said second latch for engaging said jam key when said backrest frame is locked in said vertical use position; and an actuator for simultaneously unlocking said first and second latches such that said jam key is pivoted about said latch axis out of engagement with said abutment seat prior to moving said backrest frame toward said folded position and wherein the distance between said latch axis and said abutment seat diminishes as said backrest frame is moved from said use position toward said folded position such that said jam key becomes compressed as said backrest frame is pivoted while said backrest frame is locked in said vertical use position.

2. A backrest as set forth in claim 1 wherein said jam key includes a convex engagement surface having a circular curvature centered about said latch axis.

3. A backrest as set forth in claim 2 wherein said abutment seat includes a concave engagement surface having a circular curvature centered about said latch axis when said backrest frame is in said use position.

4. A backrest as set forth in claim 3 further including a spring disposed between said backrest frame and said jam key for biasing said jam key toward said extended position.

5. A backrest as set forth in claim 4 wherein said spring comprises a flat spring.

6. A backrest as set forth in claim 3 wherein said actuator includes a flexible motion transmitting cable slidably supported in a protective conduit.

7. A backrest as set forth in claim 6 wherein said cable extends between first and second ends thereof, one of said first and second ends operatively connected to said jam key.

8. A backrest as set forth in claim 7 wherein said actuator includes a push rod operatively connecting the other of said first and second ends of said cable.

9. A backrest as set forth in claim 3 wherein said second hinge includes a base plate and a center bracket extending generally perpendicularly from said base plate.

10. A backrest as set forth in claim 9 wherein said abutment seat extends upwardly from said base plate.

11. A backrest as set forth in claim 10 wherein said second hinge includes a hinge pin pivotally connecting said second end of said backrest frame to said center bracket.

12. A backrest as set forth in claim 11 wherein said backrest frame includes a reinforcing insert, said jam key and said hinge pin being operatively connected to said reinforcing insert.

13. A folding passenger seat assembly 9 for a motor vehicle, said assembly comprising: a seat cushion; a primary backrest portion including a backrest frame having a first end and a second end; a first hinge operatively associated with said first end of said backrest frame and a second hinge operatively associated with said second end of said backrest frame, said first and second hinges pivotally supporting said backrest frame relative to said seat cushion about a folding axis for movement between a vertical use position and a folded position; a first latch associated with said first end of said backrest frame for selectively locking said backrest frame in said vertical use position; a second latch operatively associated with said second end of said backrest frame for selectively locking said backrest frame in said vertical use position; a remote actuator supported on said backrest frame for simultaneously unlocking said first and second latches; one of said first and second latches including a jam key pivoted on a pintle about a latch axis spaced parallel from said folding axis for movement between extended and retracted positions, an abutment seat fixed relative to said folding axis for engaging said jam key when said backrest frame is locked in said vertical use position.

14. An assembly as set forth in claim 13 wherein the distance between said latch axis and said abutment seat diminishes as said backrest frame is moved from said use position toward said folded position such that said jam key becomes compressed as said backrest frame is pivoted while said backrest frame is locked in said vertical use position.

15. An assembly as set forth in claim 14 wherein said jam key includes a convex engagement surface having a circular curvature centered about said latch axis, and said abutment seat includes a concave engagement surface having a circular curvature centered about said latch axis when said backrest frame is in said use position.

16. An assembly as set forth in claim 15 further including a spring disposed between said backrest frame and said jam key for biasing said jam key toward said extended position.

17. An assembly as set forth in claim 15 wherein said actuator includes a flexible motion transmitting cable extending between first and second ends thereof, one of said first and second ends operatively connected to said jam key.

18. An assembly as set forth in claim 15 wherein said second hinge includes a base plate and a center bracket extending generally perpendicularly from said base plate.

19. An assembly as set forth in claim 18 wherein said abutment seat extends upwardly from said base plate.

20. An assembly as set forth in claim 19 wherein said second hinge includes a hinge pin pivotally connecting said second end of said backrest frame to said center bracket.

21. An assembly as set forth in claim 20 wherein said backrest frame includes a reinforcing insert, said jam key and said hinge pin being operatively connected to said reinforcing insert.

22. An assembly as set forth in claim 20 further including a secondary backrest independently pivotally supported on said hinge pin about said folding axis for movement between a vertical use position and a folded position.

* * * * *